US010731961B2

(12) United States Patent
Trent

(10) Patent No.: US 10,731,961 B2
(45) Date of Patent: Aug. 4, 2020

(54) ELECTRICAL BOX INSTALLATION TOOL

(71) Applicant: Ronnie Alder Trent, Coeur D'Alene, ID (US)

(72) Inventor: Ronnie Alder Trent, Coeur D'Alene, ID (US)

(*) Notice: Subject to any disclaimer, the term of this patent is extended or adjusted under 35 U.S.C. 154(b) by 198 days.

(21) Appl. No.: 15/895,847

(22) Filed: Feb. 13, 2018

(65) Prior Publication Data
US 2018/0231363 A1 Aug. 16, 2018

Related U.S. Application Data

(60) Provisional application No. 62/458,433, filed on Feb. 13, 2017.

(51) Int. Cl.
| G01B 3/32 | (2006.01) |
| B25B 11/00 | (2006.01) |
| G01B 3/56 | (2006.01) |
| H02G 1/00 | (2006.01) |
| G01C 15/02 | (2006.01) |
| H02G 3/08 | (2006.01) |

(52) U.S. Cl.
CPC ............... G01B 3/32 (2013.01); B25B 11/00 (2013.01); G01B 3/566 (2013.01); H02G 1/00 (2013.01); *G01C 15/02* (2013.01); *H02G 3/08* (2013.01)

(58) Field of Classification Search
CPC . G01B 3/32; G01B 3/566; G01B 5/14; H02G 1/00; H02G 3/00; H02G 3/08; H02G 3/10; H02G 3/12; B25B 11/00
USPC .................................... 33/562, 528, DIG. 10
See application file for complete search history.

(56) References Cited

U.S. PATENT DOCUMENTS

| 2,919,913 | A | * | 1/1960 | Phair | H02G 3/125 269/50 |
| 2,956,798 | A | * | 10/1960 | Briggs | H02G 3/126 269/76 |
| 2,962,281 | A | * | 11/1960 | Hodgson | H02G 3/125 269/77 |
| 2,990,172 | A | * | 6/1961 | Gianotta | H02G 3/125 269/50 |
| 3,436,070 | A | * | 4/1969 | Sanson | H02G 3/125 269/8 |
| 3,601,386 | A | * | 8/1971 | Estep | H02G 1/00 269/6 |
| 3,875,669 | A | * | 4/1975 | Hull | H02G 3/125 33/528 |
| 3,954,717 | A | * | 5/1976 | Tarr | B25B 11/02 269/82 |
| 4,290,591 | A | * | 9/1981 | Smith | B25B 7/00 269/6 |

(Continued)

*Primary Examiner* — Christopher W Fulton
(74) *Attorney, Agent, or Firm* — Lee & Hayes, P.C.

(57) ABSTRACT

An apparatus for installing an electrical box includes a shaft including one or more distance markings disposed along a length of the shaft; and a gauge block. The gauge block includes at least one slit sized to accommodate a sidewall of the electrical box, and one or more holes disposed along a length of the at least one slit. The one or more holes are sized to accommodate ribbing on the sidewall of the electrical box. A through hole extends through a length of the block in a same direction as the length of the at least one slit. At least one set screw secures the gauge block in place along the length of the shaft when the shaft is inserted in the through hole in the gauge block.

19 Claims, 2 Drawing Sheets

(56) References Cited

U.S. PATENT DOCUMENTS

| | | | | |
|---|---|---|---|---|
| 4,750,271 A * | 6/1988 | Ericksen | ............... | B25B 5/06 |
| | | | | 269/904 |
| 4,850,115 A * | 7/1989 | Price | ............... | H02G 3/125 |
| | | | | 33/528 |
| 4,890,391 A * | 1/1990 | Warren | ............... | H02G 3/126 |
| | | | | 33/613 |
| 4,901,447 A * | 2/1990 | Gottschalk | ............... | H02G 3/125 |
| | | | | 269/6 |
| 5,072,523 A * | 12/1991 | Bennett | ............... | H02G 3/125 |
| | | | | 269/904 |
| 5,111,593 A * | 5/1992 | Gehen, Sr. | ............... | H02G 1/00 |
| | | | | 33/613 |
| 5,348,274 A * | 9/1994 | Breen | ............... | H02G 1/00 |
| | | | | 269/3 |
| 5,491,901 A * | 2/1996 | Parrino | ............... | H02G 3/126 |
| | | | | 33/528 |
| 5,630,281 A * | 5/1997 | Pledger | ............... | H02G 1/00 |
| | | | | 269/904 |
| 5,921,522 A * | 7/1999 | Weber | ............... | H02G 1/00 |
| | | | | 248/544 |
| 7,373,730 B2 * | 5/2008 | Murphy | ............... | H02G 3/123 |
| | | | | 33/528 |
| 2004/0049933 A1 * | 3/2004 | Hicks | ............... | H02G 1/00 |
| | | | | 33/528 |
| 2006/0265893 A1 * | 11/2006 | Gifford | ............... | H02G 3/126 |
| | | | | 33/528 |

* cited by examiner

ELECTRICAL BOX INSTALLATION TOOL

CROSS REFERENCE TO RELATED PATENT APPLICATIONS

This application claims priority to and incorporates U.S. Provisional Application Ser. No. 62/458,433, filed Feb. 13, 2017, entitled "Electrical Box Installation Tool with Height Adjustment," in its entirety by reference.

BACKGROUND

The building process, whether commercial or residential, large scale projects or small, can be a meticulous process involving routine but exact measurements. There are common features of a building that are routinely placed at a specific distance from a reference point. For example, features like light switches, electrical outlets, vents, etc., may be set at a uniform distance from respective reference points throughout a building. One such example may be the placement of electrical outlets. Electrical outlets are often placed at a specific distance from a reference point. These reference points may include but are not limited to a distance above a finished floor, a distance from a door frame, a distance from another feature, etc, and are further placed at specific depths within the building, so as to align with outer face plates.

During the building of a structure, electrical outlets and other fixtures may be designed to be placed at a uniform distance from a reference point throughout the structure. For example, all (or most) electrical outlets throughout a structure may be placed at a distance of 12 inches above a finished floor. Therefore, the same measurement may be made for all electrical outlets throughout the structure. Furthermore, following the example above, light switches may also be placed at a different distance from a same or different reference point. For example, light switches may be placed at a distance of 48 inches above a finished floor. Once the height of the light switches and electrical boxes is determined, the depth must also be measured and marked. This process of measuring height and depth is a time consuming process that introduces many opportunities for human error.

There is desired a solution that allows a user to quickly determine a specific distance from a reference point. Additionally, it is desired that such a solution would allow the user to easily switch between different lengths as they determine distances and place electrical boxes at the determined distance.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features. Furthermore, the drawings may be considered as providing an approximate depiction of the relative sizes of the individual components within individual figures. However, the drawings are not to scale, and the relative sizes of the individual components, both within individual figures and between the different figures, may vary from what is depicted. In particular, some of the figures may depict components as a certain size or shape, while other figures may depict the components on a larger scale or differently shaped for the sake of clarity.

DETAILED DESCRIPTION

Overview

This disclosure is directed to an installation tool that allows for quick measurement and installation of features in a building structure. More specifically, the device described herein may be used in the installation of electrical boxes in a building structure. While this embodiment describes a measurement and installation tool for installing electrical boxes in a building structure, it is to be appreciated that this tool may be used for the installation of other features in a building structure or in other industries where routine placement of features is necessary. The term "electrical box" refers to any type of electrical box used behind an electrical outlet or light switch, or other wiring node. The installation tool is described with respect to the figures as follows.

Figure 1:
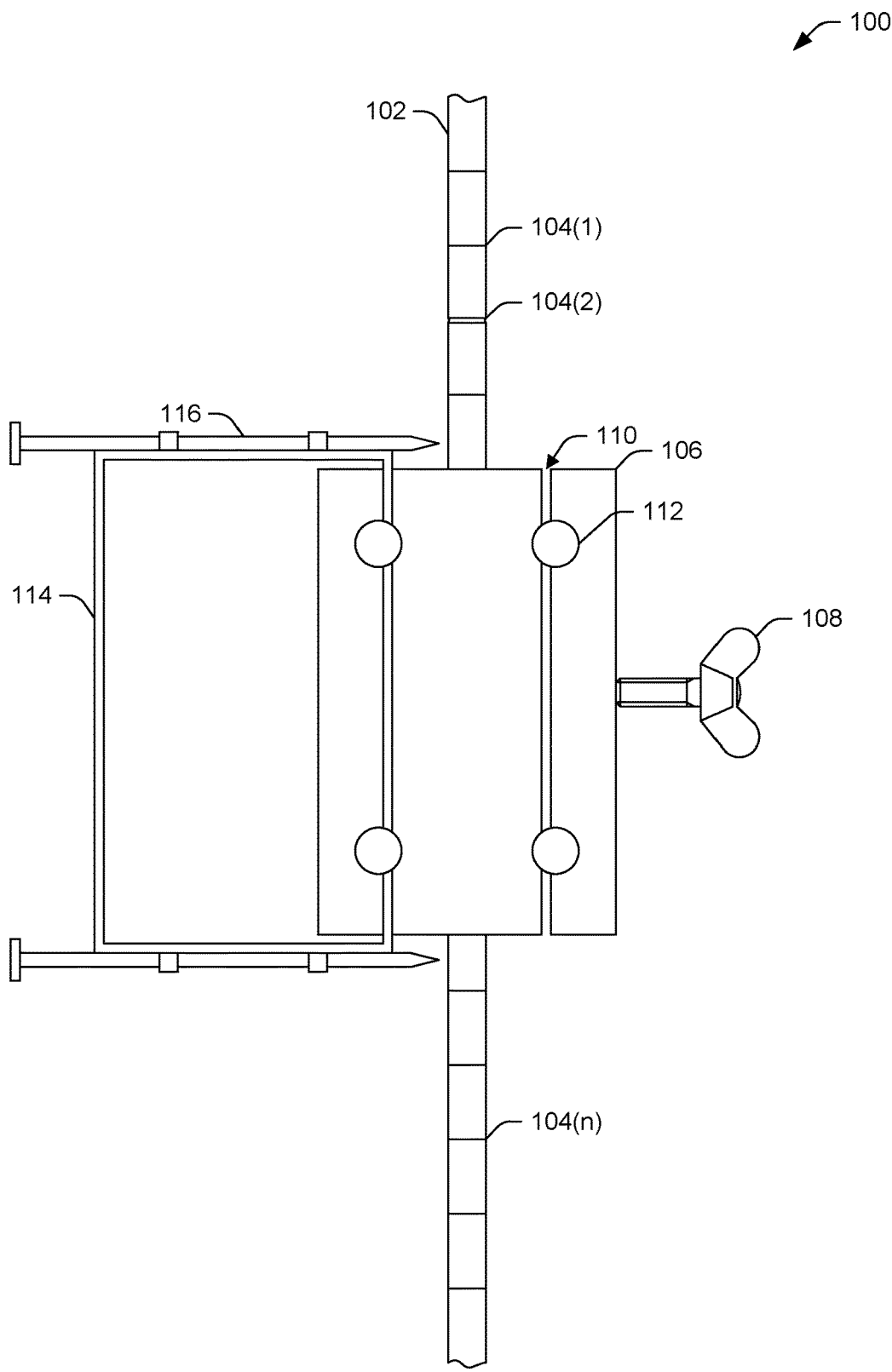
FIG. 1 illustrates a front view of a quick height measurement device according to an embodiment of this application.
Figure 2:
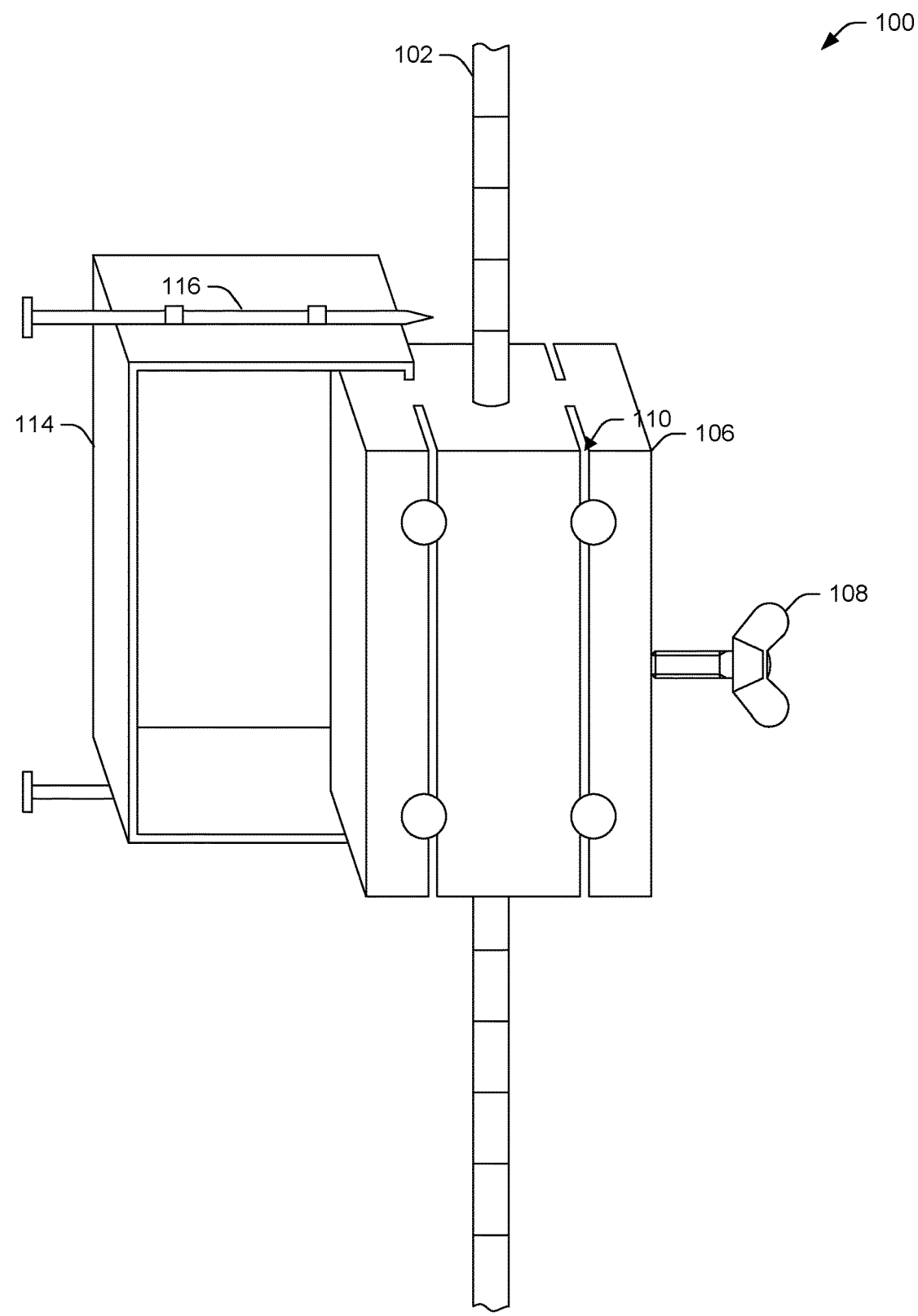
FIG. 2 illustrates an isometric view of the quick height measurement device according to FIG. 1.

FIG. 1 depicts a front view of an installation tool 100 for measuring a distance and installing electrical boxes throughout a building structure. In some instances, the installation tool 100 may include a shaft 102. The shaft 102 may serve as a ruler for the installation tool 100. For example, the shaft 102 may include one or more distance markings 104 (i.e., 104(1), 104(2), . . . and 104(n)). The one or more distance 104 markings may be set at a uniform distance from each other. For example, the one or more distance markings 104 may be set at ¼", ½", or 1" intervals. However, in other embodiments, the one or more distance markings 104 may be set at uneven distance intervals. For example, the shaft may include distance markings 104 at common distances (i.e., 12", 18", 48", etc.). Additionally, and/or alternatively, the shaft 102 may include one or more types of distance markings 104. In an embodiment, the distance markings 104 may include small grooves (as shown by 104(2)), etches, or notches to assist in the measurement function. Further, the shaft 102 may include a set of distance markings 104 set in imperial units and a set of distance markings 104 set in metric units. The shaft 102 may be any desired length used for measurement. In some embodiments, a user may set the shaft 102 on a finished floor to measure a distance above the finished floor by using the distance markings 104 on the shaft 102. While FIGS. 1 and 2 depict the shaft 102 as being substantially cylindrical, the shaft 102 may be any desired shape such as rectangular, square, cylindrical, elliptical, etc. In some embodiments, the shaft 102 may include a diameter of 5/16". However, in other embodiments, the shaft 102 may be any desired diameter. For example, a larger diameter shaft 102 may provide a stronger shaft 102. The shaft 102 may include any of the following materials, or a variant thereof: fiber glass, plastic, metal, metal alloy, etc.

The installation tool 100 may also include a gauge block 106. In some instances, the gauge block 106 may include a hole through the center of a length of the block. The shaft 102 described above may be disposed through the hole in the gauge block 106. In an embodiment, the gauge block 106 may further include a set screw 108. Once the shaft 102 is inserted through the gauge block 106, the set screw 108 may be used to assist in securing the gauge block 106 to the shaft 102 at a desired height. For example, a user may desire to set the gauge block at 12" above a reference point. The user would slide the shaft 102 into the gauge block 106, set the gauge block at the distance marking 104 corresponding with 12" above a reference point (i.e., above a finished floor), and, in the event that a set screw 108 is included, tighten the set screw 108 to secure the gauge block at the 12" distance marking 104. The set screw 108 may have a diameter of ¼". However, in other embodiments, any size of set screw 108 may be used. Alternatively, the friction between the surfaces of shaft 102 and gauge block 106 may be such that no set screw is needed to maintain the position.

The gauge block 106 may be made of any of the following materials, or a variant thereof: fiber glass, plastic, carbon fiber, metal, metal alloy, wood, etc. The gauge block 106 may have a size able to fit inside an electrical box (described further herein below) or other features. In some instances, the gauge block 106 may have a thickness of about 1½", a width of about 2", and a height of about 3½". However, in other embodiments, the gauge block 106 may be designed to accommodate the installation of any features that may be attached thereto.

The gauge block 106 may further include one or more slits 110 and one or more holes 112 (e.g., opening that widens the slit at a predetermined position) to accommodate an electrical box 114 to be disposed therein. The gauge block 106 may include any number of slit(s) 110. For example, the gauge block 106 may include one slit 110, two slits 110, three slits 110, or four slits 110. These slit(s) 110 may be cut at uniform depths. For example, each slit may cut at ½" deep. However, in other embodiments, each slit 110 may have a differing depth. In still further embodiments, the gauge block 106 may include sets of slits 110 having the same depths. For example, in an instance where the gauge block 106 includes four slits 110 (i.e., two on each side as shown in FIG. 2), two slits 110 may have a depth of ½" and two slits 110 may have a depth of ⅝". In such an instance, the slits 110 having a matching depth may be disposed on a same side of the gauge block 106, or the slits 110 having a matching depth may disposed on opposing sides of the gauge block 106. The holes 112 of the gauge block 106 may be disposed along the slits 110 to accommodate any ribbing or other features along the side of the electrical box 114.

As mentioned previously, the slit(s) 110 and hole(s) 112 accommodate an electrical box 114 disposed therein. Furthermore, as mentioned above, the electrical box 114 refers to any type of electrical box used behind an electrical outlet or light switch, for example. The electrical box 114 may disposed in one of the slits 110 in the gauge block 106. The slit 110 may hold the electrical box 114 in place while a user uses the shaft 102 to measure a distance from a reference point. Once the gauge block 106 is aligned with the desired distance, the electrical box 114 may be placed against a stud or other placement point and one or more fasteners 116 may secure the electrical box 114 to the desired placement point. This allows a user to set the gauge block 106 at a specific distance along the shaft 102 and quickly install electrical boxes 114 throughout a building structure. A user may select which slit 110 to place the electrical box 114 into (i.e., ½" or ⅝"). Depending on the slit 110 the user selects it will determine how far back from the front of a stud the electrical box 114 will be set. For example, if a user places the electrical box 114 in a ½" deep slit 110, then the electrical box 114 will be installed ½" on the stud or other fixing member the user may use.

FIG. 2 depicts an isometric (or perspective) view of the installation tool 100. FIG. 2 depicts the installation tool 100 with an electrical box 114 disposed therein prior to installation. Referring to FIG. 2, a user may place the electrical box 114 in a slit 110 in the gauge block, place the back side of the gauge block 106 on a stud such that the right hand side of the electrical box 114 comes into contact with the left hand side of the stud, and then fix the attachment mechanism 116 of the electrical box 114 to the stud. This example provides on embodiment for the installation of an electrical box 114. It is contemplated that other alternatives that are within the scope of this invention may be implemented by one having ordinary skill in the art.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the claimed subject matter.

What is claimed is:

1. An apparatus for installing an electrical box, the apparatus comprising:
   a shaft; and
   a gauge block that is slidable along the shaft, the gauge block including:
   at least one slit extending in a vertical direction along a height of the gauge block and adjacent to an edge thereof, the slit having a depth extending in a direction orthogonal to the vertical direction and ending a predetermined distance into the gauge block in a width direction of the gauge block, a width of the slit sized to accommodate insertion of a sidewall of the electrical box, and the height of the gauge block extending less than a height of the sidewall of the electrical box,
   one or more openings disposed across a width direction of the at least one slit, the one or more holes being sized to accommodate ribbing on the sidewall of the electrical box,
   a through hole extending through a length of the block in a same direction as the length of the at least one slit, and
   at least one set screw to secure the gauge block in place along the length of the shaft when the shaft is inserted in the through hole in the gauge block.

2. The apparatus according to claim 1, wherein the shaft includes one or more distance markings disposed along a length of the shaft that are etches in the shaft.

3. The apparatus according to claim 1, wherein a material of the shaft includes fiber glass, plastic, metal, or metal alloy.

4. The apparatus according to claim 1, wherein the set screw has a size of ¼" diameter.

5. The apparatus according to claim 1, wherein the shaft has a diameter of 5/16".

6. The apparatus according claim 1, wherein the at least one slit has a depth of ½" into a side of the gauge block.

7. The apparatus according to claim 1, wherein the at least one slit has a depth of ⅝" into a side of the gauge block.

8. The apparatus according to claim 1, wherein the at least one slit is sized to accommodate a 4" sidewall of the electrical box.

9. The apparatus according to claim 1, wherein a material of the gauge block includes fiber glass, plastic, carbon fiber, metal, or wood.

10. A measurement device comprising:
    a block including:
    two or more slits extending in a vertical direction along a height of the block and adjacent to an edge thereof, the two or more slits having a depth extending in a direction orthogonal to the vertical direction and ending a predetermined distance into the block in a width direction of the block, a width of the two or more slits being sized to accommodate insertion of a sidewall of the electrical box, and the height of the block extending less than a height of the sidewall of the electrical box, the two or more slits being cut into a side of the block at different depths, respectively, and a through hole extending through a length of the block, the through hole sized to frictionally accommodate an elongated rod therein.

11. The measurement device according to claim 10, wherein a first slit of the two or more slits is disposed on a first side of the block and a second slit of the two or more slits is disposed on a second side of the block, wherein the first side is opposite the second side.

12. The measurement device according to claim 11, wherein the first slit has a depth of ½" into the block.

13. The measurement device according to claim 11, wherein the second slit has a depth of ⅝" into the block.

14. The measurement device according to claim 10, wherein the block further includes a set screw disposed on a side of the block such that, when the block is placed on the elongated rod, the set screw is positioned to secure the block along a length of the the elongated rod.

15. The measurement device according to claim 10, wherein the block has a thickness of about 1½", a width of about 2", and a height of about 3½".

16. An electrical box installation tool comprising:
a shaft;
a depth gauge that is slidable along the shaft, the depth gauge including:
  a slit configured to receive an electrical box therein, the slit extending in a vertical direction along a height of the depth gauge and adjacent to an edge thereof, the slit having a depth extending in a direction orthogonal to the vertical direction and ending a predetermined distance into the depth gauge in a width direction of the depth gauge, a width of the slit being sized to accommodate insertion of a sidewall of the electrical box, and the height of the depth gauge extending less than a height of the sidewall of the electrical box, and
  a hole through a center portion of the depth gauge, the shaft sized to be disposed through the hole; and
a set screw disposed in the depth gauge to secure the depth gauge to the shaft.

17. The electrical box installation tool according to claim 16, wherein the slit is a first slit having a first depth, and wherein the depth gauge further includes a second slit.

18. The electrical box installation tool according to claim 17, wherein the second slit has a second depth that is different than the first depth.

19. The electrical box installation tool according to claim 18, wherein the first depth is about ⅝" and the second depth is about ½".

* * * * *